S. A. MIKALSON.
CULINARY VESSEL.
APPLICATION FILED JULY 19, 1919.
1,321,768.
Patented Nov. 11, 1919.
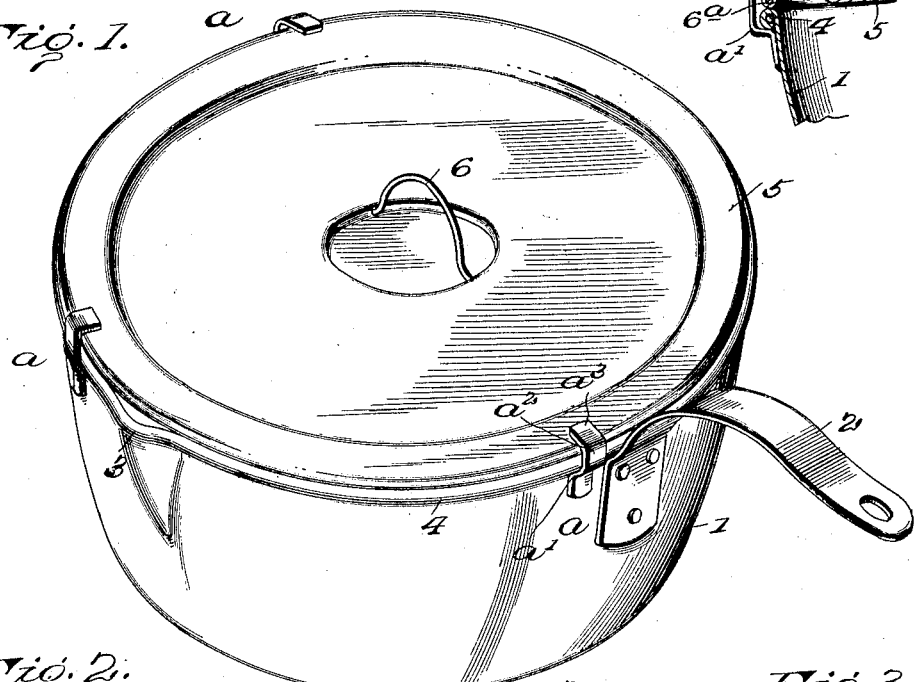
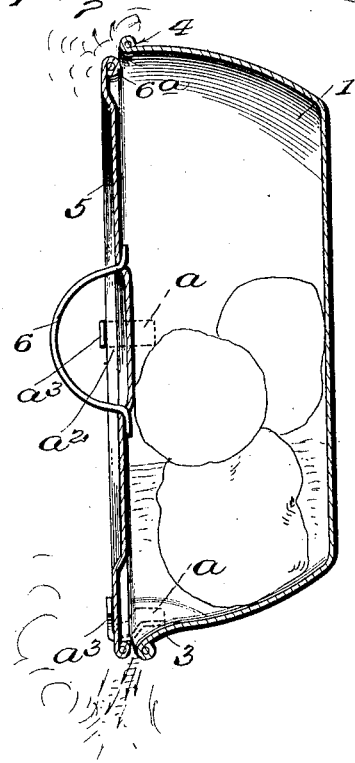
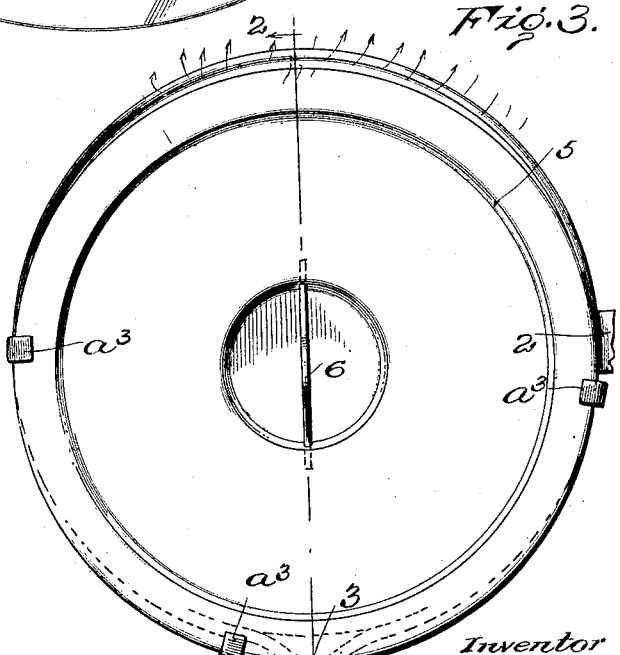
Inventor
S. A. Mikalson
by Hubert Peck
his Atty

UNITED STATES PATENT OFFICE.

SEVERINE A. MIKALSON, OF HAZELTON, NORTH DAKOTA.

CULINARY VESSEL.

1,321,768.  Specification of Letters Patent.  Patented Nov. 11, 1919.

Application filed July 19, 1919. Serial No. 312,098.

*To all whom it may concern:*

Be it known that I, SEVERINE A. MIKALSON, a citizen of the United States of America, and resident of Hazelton, county of Emmons, State of North Dakota, have invented certain new and useful Improvements in and Relating to Culinary Vessels, of which the following is a specification.

This invention relates to certain improvements in culinary vessels; and the objects and nature of the invention will be readily understood by those skilled in the art in the light of the following explanation of the accompanying drawings illustrating what I now believe to be the preferred embodiment of my invention from among other forms within the spirit and scope thereof.

An object of the invention is to provide a kettle, sauce pan, or other culinary vessel with simple and efficient means for loosely maintaining the cover against falling from the vessel when the vessel is tilted for draining off liquid, and to provide such means as an integral, meaning, a fixed part of the vessel and of such formation that no special construction of either cover or vessel is required so that any stock or ordinary cover of the proper size can be employed and so that the cover will drop down approximately over or in front of the pouring mouth of the vessel when the vessel is tilted to prevent solid matter passing through said mouth and so that the cover, when the vessel is thus tilted, will be held against falling from the vessel yet can move outwardly a distance from the edge thereof, to permit flow of the liquid from the vessel.

The invention consists in certain novel features in construction and in combinations and arrangements as more fully and particularly set forth and specified hereinafter.

Referring to the accompanying drawings:—

Figure 1, shows a covered culinary vessel equipped with my invention.

Fig. 2, shows the same tilted for pouring.

Figs. 3 and 4 are detail and sectional views.

The form of culinary vessel 1 that I happen to select for illustration is provided with a rigid laterally or radially projecting handle 2, and a side pouring mouth or nozzle 3, of the common type. This vessel is formed with a wired or beaded top edge 4, and this edge is shown circular except for the lateral bulge or offset where the beaded edge follows the upper end of the nozzle.

This vessel is provided with any suitable loose disk-like cover 5. This cover is usually composed of a circular disk of embossed imperforate (excepting the perforations that receive the ends of the handle bail 6, if employed) sheet metal. Usually the cover is formed with a down turned beaded or rolled edge $6^a$, and the diameter of the cover is usually approximately equal to the outside diameter of the top edge 4 of the vessel so that the cover edge $6^a$ rests loosely on and is centered in the vessel edge 4, leaving the pouring mouth or nozzle 3 uncovered. However, I do not wish to limit my invention to these vessel and cover details.

In the drawings, I illustrate a specific embodiment of my invention, wherein the vessel is provided with three upstanding rigid hook-like or overhanging similar lugs $a$. Each lug is fixed to the exterior of the vessel wall below the beaded edge 4, and is offset outwardly, at $a'$, to extend upwardly past and, usually, spaced outwardly from edge 4. This offset provides the vertical stop $a^2$ of the lug arranged outwardly from the circle of said edge and extending a substantial distance above the horizontal plane of said edge.

The upper end of the lug is deflected inwardly or radially with respect to the vessel to form the horizontal stop $a^3$ overhanging the edge 4 and spaced upwardly a substantial distance therefrom, a distance that substantially exceeds the vertical thickness of the edge portion of the cover.

I show one of these lugs, the intermediate lug, arranged adjacent to the pouring mouth of the vessel, just to one side thereof. The second lug is located adjacent to the vessel handle, between the same and the pouring mouth, and the third lug is arranged approximately diametrically opposite said second lug. The cover can be easily applied to and removed from the vessel laterally, that is between the second and third lugs. When the cover is in normal central position on the vessel, the overhanging or top stops of the lugs, are spaced upwardly a distance from the top surface of the cover, and the vertical stops of the lugs are spaced outwardly a distance from the edge of the cover.

In other words, the cover is loose and free so far as said lugs are concerned. The cover, when in normal position, is hence free to rise and fall a limited distance so far as said lugs are concerned.

The vessel is tilted by its handle to pour off liquid through the vessel mouth and during this operation the cover retains the vegetables or other food in the vessel and the lugs hold the cover against falling from the vessel, hence it is not then necessary to apply the hands to the cover.

When the vessel is tilted for draining, the loosely confined cover slides or drops down over the pouring mouth and into engagement with the vertical stop of the center or intermediate lug. When in this position, the cover extends over and downwardly beyond the lower portion of the vessel edge 4. When the vessel is thus tilted, the weight of the contents of the vessel will force the cover outwardly into engagement with the top or overhanging stops of the lugs and thus provide a narrow space or slit between the vessel edge 4 and the under surface of the cover through which the liquid can drain from the vessel while the cover holds back the solid food products within the vessel. When the vessel is tilted for draining and the cover slides down, as described, a slot or opening is exposed between the upper portion of the cover and the elevated portion of the vessel, through which steam can escape.

Culinary vessel covers wear or rust out much more rapidly than do the vessels, and as my invention does not require a cover of perforated or other special construction, new covers of the ordinary stock construction can be purchased and used.

It is evident that various modifications might be resorted to without departing from the spirit and scope of my invention as defined by the following claims and hence I do not wish to limit myself to the exact disclosures hereof.

What I claim is:—

1. A culinary vessel adapted to be tilted for draining while retaining the solid food products, said vessel having a top cover normally centered on the top edge of the vessel and slidable laterally thereon when the vessel is tilted for draining, said vessel provided with fixed lugs loosely confining the cover against falling from the vessel when tilted, said lugs overhanging and spaced a substantial distance from the outer face of the cover.

2. A culinary vessel having a loose removable top cover normally centered by and resting on the top edge of the vessel, said vessel provided with upstanding lugs overhanging and spaced a substantial distance from the top surface of the cover to permit outward movement of the cover from the vessel edge when the vessel is tilted for draining.

SEVERINE A. MIKALSON.

Copies of this patent may be obtained for five cents each, by addressing the "Commissioner of Patents, Washington, D. C."